United States Patent [19]

Ogata et al.

[11] Patent Number: 5,698,479
[45] Date of Patent: *Dec. 16, 1997

[54] GLASS FIBER FOR NON-WOVEN FABRIC AND A METHOD OF PRODUCING A LAMINATE

[75] Inventors: Masaru Ogata, Shiga-ken; Masayuki Noda; Ken-ichi Kariya, both of Hikone; Masayuki Arioka, Otsu; Masaru Tachiiri, Shiga-ken; Masaaki Yoshida, Otsu, all of Japan

[73] Assignee: Shin-Kobe Electric Machinery Co., Ltd., Tokyo, Japan

[*] Notice: The term of this patent shall not extend beyond the expiration date of Pat. No. 5,584,965.

[21] Appl. No.: 698,789

[22] Filed: Aug. 16, 1996

Related U.S. Application Data

[62] Division of Ser. No. 375,547, Jan. 19, 1995, Pat. No. 5,584,965.

[51] Int. Cl.⁶ .................. B32B 17/04; C08K 3/40
[52] U.S. Cl. .............. 442/175; 442/180; 156/256; 162/156; 427/389.7
[58] Field of Search .................. 156/250, 256, 156/156, 158, 62.8; 428/290, 251; 427/389.8, 407.3, 387, 389.7, 389.9; 162/123, 145; 442/175, 180

[56] References Cited

U.S. PATENT DOCUMENTS 4,749,614   6/1988   Andrews et al. ............... 428/290

*Primary Examiner*—Jeff H. Aftergut
*Assistant Examiner*—Sam Chuan Yao
*Attorney, Agent, or Firm*—Pearne, Gordon, McCoy & Granger LLP

[57] ABSTRACT

Glass fiber for non-woven fabric base material of a laminate having a surface treated by sizing agent essentially comprising silane coupling agent and dispersing agent, and said silane coupling agent including epoxy-silane and styryl amino-silane.

6 Claims, No Drawings

GLASS FIBER FOR NON-WOVEN FABRIC AND A METHOD OF PRODUCING A LAMINATE

This is a division of application Ser. No. 08/375,547, filed Jan. 19, 1995 now U.S. Pat. No. 5,584,965.

BACKGROUND OF THE INVENTION

This invention pertains to glass fiber suitably available for non-woven fabric base material of a laminate and also to a method of producing a laminate comprising such glass fiber non-woven fabric base material.

Glass fiber is produced by spinning while molten glass is extruded through fine holes in a bottom of a platinum pot called a bushing. A number of glass fibers are tightly bound and wound, before which a surface of glass fiber is treated by sizing agent.

Glass fiber non-woven fabric or mat available for base material of a laminate is produced by paper-making after the bound glass fibers are finely cut into glass chopped strands and dispersed in white water. The bound glass chopped strands should be essentially scattered and homogenously dispersed in white water.

Thus, it will be noted that the sizing agent on the surface of the glass chopped strands is required to have functions of promoting the dispersibility of glass chopped strands and also of preventing the dispersed glass chopped strands from cohering.

Conventionally, the sizing agent for glass fiber of laminate base material comprises compound including water soluble polymer such as starch, acrylic amide vinyl acetate copolymer, carboxymethyl cellulose and polyvinyl alcohol, dispersing agent such as cationic fatty acid amide and silane coupling agent such as epoxy silane.

However, the glass chopped strands on the surfaces thereof having the conventional sizing agent cannot be fully dispersed in white water when glass fiber non-woven fabric or mat is produced. The thus produced glass fiber non-woven fabric has a number of glass chopped strands included while being tightly bound.

As such glass fiber non-woven fabric is impregnated with resin varnish and dried to produce prepreg, the portion of the glass fiber non-woven fabric including the glass chopped strands tightly bound tends to fail to be impregnated with resin or to be insufficiently impregnated with resin.

A laminate of glass fiber non-woven fabric base material formed by deforming such prepregs under heat and pressure has heat applied to form an electrically insulating board, but it tends to blister at the portion of the laminate including the tightly bound glass chopped strands.

The laminate of glass fiber non-woven fabric has insufficient characteristics of moisture resistance and electrical insulation for the electrically insulating boards. Of late, a wiring pattern of a printed board has a high density and is required to have a distance of 0.3 mm between through holes and to have improved characteristics of moisture resistance and electrical insulation in view of prevention of migration. Thus, it will be noted that the laminate of conventional glass fiber non-woven fabric could not be used for the printed board because it had poor characteristics of moisture resistance and electrical insulation.

SUMMARY OF THE INVENTION

A principal object of the invention is to provide glass fiber suitably available for producing non-woven fabric base material of a laminate having improved characteristics of thermal resistance, moisture resistance and electrical insulation, which can be accomplished by glass chopped strands being fully dispersed in white water.

Another object of the invention is to provide a method of producing a laminate of glass fiber non-woven fabric base material having improved characteristics of thermal resistance, moisture resistance and electrical insulation, which can be also accomplished by glass chopped strands being fully dispersed in white water.

In accordance with one aspect of the invention, there is provided glass fiber for non-woven fabric base material of a laminate having a surface treated by sizing agent essentially comprising silane coupling agent and dispersing agent, and said silane coupling agent including epoxy-silane and styryl amino-silane.

In accordance with another aspect of the invention, there is provided a method of producing a laminate of glass fiber non-woven fabric base material comprising the steps of;

- binding glass fibers having a surface treated by sizing agent essentially comprising silane coupling agent and dispersing agent, and said silane coupling agent including epoxy-silane and styryl amino-silane;
- cutting said glass fibers into glass chopped strands;
- forming glass fiber non-woven fabric by dispersing said glass chopped strands in white water and making paper out of said glass chopped strands;
- impregnating said glass fiber non-woven fabric with resin varnish;
- and deforming laminate of prepregs including at least said prepreg produced by former step under heat and pressure.

The dispersing agent serves to homogenously disperse glass chopped strands in white water. It should be particularly noted that the dispersing agent of cationic fatty acid amide serves to effectively prevent glass chopped strands dispersed in white water from cohering therein. Thus, the glass fiber non-woven fabric is prevented from having a number of glass chopped strands kept tightly bound therein. As a result, it can be fully impregnated with resin varnish, but neither failing to be impregnated nor being insufficiently impregnated with resin varnish. This enables the laminate to have an improved thermal resistance.

The epoxy silane and styryl amino silane such as cationic styryl silane of the silane coupling agent promote the adhesion of the glass fibers to the resin with which the glass fiber non-woven fabric is impregnated.

Such improved adhesion of glass fibers to resin offers the laminate having improved characteristics of moisture resistance and electrical insulation because moisture is hard to be invaded into the interface thereof.

Since the silane coupling of only epoxy silane cannot fully improve adhesion of glass fibers to resin, the resultant laminate fails to have good characteristics of moisture resistance and electrical insulation.

Thus, it should be noted that the silane coupling agent of both epoxy silane and styryl amino-silane such as cationic styryl silane improves adhesion of glass fibers to resin, which enables the laminate to have the improved characteristics of moisture resistance and electrical insulation. It should be noted that the silane coupling of only styryl amino silane fails to fully disperse glass chopped strands in white water.

DETAILED DESCRIPTION OF THE EMBODIMENT

An example of the invention, a comparison of the invention and a prior art are described hereinafter.

(EXAMPLE)

Spun glass fibers were treated with sizing agent including dispersing agent of 100 weight parts of cationic fatty acid amide manufactured by ONYX Co., Ltd, Japan under the trade name of Cation-Softner X and silane coupling agent of 70 weight parts of epoxy silane manufactured by NIPPON UNICAR Co., Ltd, Japan under the trade name of A-187 and 150 weight parts of styryl amino silane manufactured by TORAY SILICONE Co., Ltd, Japan under the trade name of SZ-6032. After 1600 of the thus treated glass fibers were tightly bound into one fiber strand. The thus produced strand was cut into glass chopped strands of 13 mm length, dispersed in white water and paper-made into glass fiber non-woven fabric in a conventional manner.

There were prepared prepreg A formed by impregnating the aforementioned glass fiber non-woven fabric with epoxy resin and drying them and prepreg B formed by impregnating conventional glass fiber woven fabric with epoxy resin. The glass fiber woven fabric was prepared by surface-treating the spun glass fibers with starch-oily binding agent and binding 400 glass fibers into strand, which was formed into yarn to provide plain fabrics of 7628 type.

Each one of prepreg B was placed on both sides of a core of predetermined number of prepregs A and copper foils, was placed on outer faces of the laminated prepregs. Therafter, the laminated prepregs and the copper foils were deformed under heat and pressure to produce a copper clad laminate of 1.6 mm thickness.

(COMPARISON)

A copper clad laminate of 1.6 mm thickness was produced in the same manner as in the aforementioned EXAMPLE except for epoxy silane not used.

(PRIOR ART)

Spun glass fibers were treated with sizing agent including dispersing agent of 100 weight parts of cationic fatty acid amide manufactured by ONYX Co., Ltd, Japan under the trade name of Cation-Softner X, 200 weight parts of water soluble polymer of polyvinyl-alkohol manufactured by NIPPON GOSEI KAGAKU KOGYO Co., Ltd, Japan under the trade name of Gohsenol GL-05 and 70 weight parts of epoxy silane manufactured by NIPPON YUNIKAA Co., Ltd, Japan under the trade name of A-187. The copper clad laminate of 1.6 mm thickness was produced from the thus treated glass fibers in the same manner as in the aforementioned EXAMPLE.

It should be noted that weight parts of the components in EXAMPLE, COMPARISON and PRIOR ART were ones of effective components.

A following TABLE shows characteristics of dispersion of glass, chopped strands when glass fiber non-woven fabric was made and characteristics of heat resistance and electrical insulation in EXAMPLE, COMPARISON and PRIOR ART, respectively. Heat resistance was measured by finding out whether the laminates blister or not after they float in a 260° C. solder bath for two minutes. Electrical insulation was measured after the laminates were treated by a pressure cooker for 48 hours.

TABLE

|  | EXAMPLE | COMPARISON | PRIOR ART |
| --- | --- | --- | --- |
| DISPERSION | good | not good | not good |
| HEAT RESISTANCE | no blister | blister | blister |
| ELECTRICAL RESITANCE ($\Omega$) | $2 \times 10^{12}$ | $4 \times 10^{12}$ | $1 \times 10^{11}$ |

As noted from the above TABLE, the glass fibers produced in accordance with "EXAMPLE" of the invention have good dispersion of glass chopped strands when glass fiber non-woven fabric was formed. The laminate which was produced by impregnaing with resin glass fiber non-woven fabric formed of glass fibers of EXAMPLE has no blister even though processed at high temperature and has higher electrical resistance after placed under high humidity atmosphere. Thus, it will be noted that the laminate of EXAMPLE has good characteristics of heat resistance, moisture resistance and electrical insulation. It should be noted that cationic fatty acid amide serves to prevent glass chopped strands dispersed in white water form cohering therein.

On the other hand, glass fibers of "COMPARISON" and "PRIOR ART" have bad dispersion of glass chopped strands when glass fiber non-woven fabric was formed. The laminates which were produced from these glass fibers have poor heat resistance because they blister when processed at high temperature. Also, the laminate produced from glass fibers of "PRIOR ART" has poor characteristics of moisture resistance and electrical insulation after placed under high humidity atmosphere.

Although one example of the invention has been described, it will be understood by those skilled in the art that various changes and modifications may be made without departing from the spirit and scope of the invention, which is defined only to the appended claims.

What is claimed is:

1. Glass fibers for dispersion in white water to form non-woven fabric base material, said glass fibers having fiber surfaces treated prior to being formed into said non-woven fabric base material with a sizing agent comprising a silane coupling agent and a dispersing agent, said silane coupling agent including an epoxy-silane and a styryl amino-silane, said fibers to be dispersed in white water to form said non-woven fabric base material, said sizing agent improving the dispersibility of said glass fibers in white water and decreasing their tendency to cohere as compared with similar glass fibers treated with a coupling agent not including said styryl amino-silane.

2. Glass fibers for non-woven fabric base material as set forth in claim 1, and wherein said dispersing agent comprises a cationic fatty acid amide.

3. Glass fibers as set forth in claim 1, wherein said styryl amino-silane is present in said sizing agent in an amount equal to substantially twice the amount of said epoxy-silane on a weight basis.

4. Non-woven fabric base material formed of glass fibers having fiber surfaces treated prior to being formed into said non-woven fabric base material with a sizing agent comprising a silane coupling agent and a dispersing agent, said silane coupling agent including an epoxy-silane and a styryl amino-silane, said fibers being dispersed in white water to form said non-woven fabric material, said sizing agent operating to homogeneously disperse said fibers and prevent cohering thereof to improve the uniformity of said non-woven fabric base material.

5. Non-woven fabric base material as set forth in claim 4, wherein said styryl amino-silane is present in said sizing agent in an amount equal to substantially twice the amount of said epoxy-silane on a weight basis.

6. Non-woven fabric base material as set forth in claim 4, wherein said glass fibers treated with said sizing agent are bound in strands and chopped to form chopped bound strands, and said chopped bound strands are dispersed in white water to form said non-woven fabric base material.

* * * * *